(12) United States Patent
Wong et al.

(10) Patent No.: US 7,236,958 B2
(45) Date of Patent: Jun. 26, 2007

(54) ELECTRONIC SOFTWARE LICENSE WITH SOFTWARE PRODUCT INSTALLER IDENTIFIER

(75) Inventors: Eric Wong, Bellevue, WA (US); Anzhelika Y. Nishanova, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 672 days.

(21) Appl. No.: 09/755,433

(22) Filed: Jan. 5, 2001

(65) Prior Publication Data

US 2002/0091644 A1    Jul. 11, 2002

(51) Int. Cl.
*G06Q 99/00* (2006.01)
*H04K 1/00* (2006.01)
*H04L 9/00* (2006.01)

(52) U.S. Cl. .............. 705/59; 705/1; 705/50; 705/51; 705/52; 705/53; 705/54; 705/56; 705/57; 705/58; 705/26; 380/201; 380/202; 713/193; 713/182; 713/189; 707/9; 709/229

(58) Field of Classification Search ............ 380/4, 380/201, 202; 705/1, 26, 50–59; 713/182, 713/189, 193; 707/9; 709/229
See application file for complete search history.

(56) References Cited

U.S. PATENT DOCUMENTS

| | | | | |
|---|---|---|---|---|
| 5,933,498 A | * | 8/1999 | Schneck et al. | 705/54 |
| 6,044,469 A | * | 3/2000 | Horstmann | 726/29 |
| 6,044,471 A | | 3/2000 | Colvin | 713/202 |
| 6,049,671 A | * | 4/2000 | Slivka et al. | 717/173 |
| 6,134,593 A | * | 10/2000 | Alexander et al. | 709/229 |
| 6,567,793 B1 | * | 5/2003 | Hicks et al. | 705/51 |

(Continued)

FOREIGN PATENT DOCUMENTS

EP        0463251 A1  *  1/1992

(Continued)

OTHER PUBLICATIONS

Aura, Tuomas "Proceeding s of the USENIX Workshop on Smartcard Technology"©May 1999. Retrieved from IDS.*

(Continued)

*Primary Examiner*—Andrew J. Fischer
*Assistant Examiner*—Nancy T. Le
(74) *Attorney, Agent, or Firm*—Merchant & Gould (57) ABSTRACT

An anti-piracy software licensing system associates a license file with a particular software product, so that the license file cannot be used with a separate product. The license is associated with one and only one product by associating an Installer Identifier (IID) with the license file. At installation, a set-up or installation program can be executed to install the software product. The set-up program will generate an IID based on a characteristic of the media and will check the generated IID against the IID stored in a license file on the same media. A match will verify that the license file on the media (i.e., the media license file) was not tampered with prior to installation and that the license file was intended to be used with the software product on the media. However, if there is not a match, then the installation will be terminated. At run-time the locally stored license file will be checked. If the license file is present, execution of the software product will be enabled. If the license is absent, execution of the software product will be disabled.

11 Claims, 6 Drawing Sheets

U.S. PATENT DOCUMENTS

| | | | |
|---|---|---|---|
| 6,785,825 B2 | 8/2004 | Colvin | 712/202 |
| 6,816,842 B1 * | 11/2004 | Singh et al. | 705/59 |
| 6,948,168 B1 * | 9/2005 | Kuprionas | 717/178 |

FOREIGN PATENT DOCUMENTS

| | | | |
|---|---|---|---|
| EP | 463251 A1 * | 1/1992 | |

OTHER PUBLICATIONS

Aura, Tuomas "Proceedings of the USENIX Workshop on Smartcard Technology" © May 1999. Retrieved from IDS.*

Keeping pirates at bay; E. Myers; *Datamation*, (Aug. 15, 1984) v. 30, N. 13, p. 53.

New technical methods, litigation restrict illicit software use; G. Legg; *Mini-Micro Systems*, (Apr. 1984) v. 17 N. 4, p. 109, 113-114.

Software license management with smart cards; T. Aura and D. Gollman; *Proceedings of the USENIX Workshop on Smartcard Tehnology (Smartcard '99)*, 1999, p. 75-85.

Copy-protection and site licenses: the practical issues; M. Scott; *Computer Law and Security Report* (May-Jun. 1986) v.2, N. 1 p. 4-5.

Software duplication and how to control it; J. Diodati; *The Office*; (Feb. 1986) v. 103, N. 2, p. 20.

Hardware protection against software piracy; T. Maude and D. Maude; *Communications of the ACM*; (Sep. 1984) v. 27, N. 9, p. 950-959.

* cited by examiner

ELECTRONIC SOFTWARE LICENSE WITH SOFTWARE PRODUCT INSTALLER IDENTIFIER

FIELD OF THE INVENTION

The present invention generally relates to providing tools to reduce software piracy. More particularly, the present invention relates to an electronic software license having an installer identifier that restricts the use of the software license to a particular software product.

BACKGROUND OF THE INVENTION

The distribution of software products exposes software manufacturers to an increased risk of software piracy. Because software products are generally distributed on some tangible media, such as a compact disk (CD), a software purchaser must be generally able to duplicate a software product from the media onto the purchaser's hard drive to properly use the software. Usually, a software product purchaser purchases only a license to use the software on a single computer (machine). Unfortunately, it can be difficult to limit the single-computer license purchaser to making only a single copy for the purchaser's single-computer use. Often, the purchaser will duplicate the software for use on other computers. Criminals will even duplicate the software for re-sale to others.

In an effort to reduce software piracy, various attempts have been made to limit the ability of users to duplicate software. In one approach, software is distributed with a printed password associated with the product packaging (e.g., printed on a CD case). The printed password corresponds to a stored password that is encoded into the software. When a user duplicates the software onto a hard drive, the user is prompted to input the printed password before the duplicated software will run for the first time. The input password is compared to the stored password that is encoded into the software. The software will be enabled only if a match is made. Unfortunately, this approach fails to prevent software pirates from creating illicit duplicates of the software. As long as a software pirate provides a copy of the printed password with each illicit copy of the software, the illicit copies will install and function properly.

Another attempt to limit the ability of a user to duplicate a software product, involves verifying the presence of an electronic software license, prior to enabling the execution of the software product. In this approach, an electronic license is generated and stored on the user's computer (e.g., hard drive) when the user attempts an installation of the software product. Subsequently, when the user attempts to run (i.e., execute) the software product, the software product will not execute if the electronic license is not present. However, this approach also has a shortcoming: the license can be copied and used with another software product that uses a similar licensing system. That is, a software pirate could purchase and install one software product and then copy the license from his hard drive to be used with other software products. Thus, the installed license could be misused to pirate other software products.

The anti-piracy approaches described above fail to prevent a user from using the electronic license provided by installing Product A to enable the use of an illicit copy of Product B. Therefore, there is a need in the art for an anti-piracy software license that will require a user to generate an electronic license to use a software product, but will also prohibit the duplication of a license for use with an illicit copy of a separate product.

SUMMARY OF THE INVENTION

The present invention meets the above-described needs by providing an anti-piracy software licensing system that associates a license file with a particular software product, so that the license file cannot be used with a separate product. The present invention associates the license with one and only one product by adding an Installer Identifier (IID) to the license file. The IID is an identification number that is used to identify a software product by characterizing the media on which the software product originally resides. The IID may be generated by "hashing" the files on the media containing a particular software product or by any other means for associating the IID with the particular, licensed software product.

At set-up, a set-up or installation program can be executed to install the software product. The set-up program requires that a user enters a product key associated with the software media (e.g., printed on a label on the media). Once the user has entered the correct product key, the set-up program will transfer the required run-time files and the license file on the media from the software media to the user's hard drive. The set-up program will then generate the IID based on a characteristic of the media and will check the generated IID against the IID stored in the license file on the same media. A match will verify that the license file on the media (i.e., the media license file) was not tampered with prior to installation and that the license file was intended to be used with the software product on the media. If there is a match, the media license file and a hardware identifier (HWID), identifying the computer on which the software is being installed, are stored in a hardware signature file. However, if there is not a match, then the installation will be halted and the user will be informed of the inability to install the software.

At run-time the locally stored license file (i.e., local license file) with the HWID of the local machine is computed and compared with the license in the hardware signature file. This is done to verify that local license file was not tampered with after installation has been completed. If there is a match it is assumed that the local license file is properly associated with the installed software product and execution of the software product is enabled. If there is not a match, the user will be prompted to repair the software.

In one aspect of the invention, a method is provided for restricting the installation of a software product. An installer identifier is generated and compared to a previously stored installer identifier. If the generated installer identifier and the stored installer identifier match, a license file is stored and a complete installation of the software product is enabled. The license file can be subsequently accessed to enable the execution of the completely installed software product.

In another aspect of the invention, a method is provided for restricting the installation and execution of a software product. An installer identifier is generated and compared to a previously stored installer identifier. If the generated installer identifier and the stored installer identifier match, a license file is stored and a complete installation of the software product is enabled. In addition, execution of the software product is enabled, in response to a determination that a proper license file has been stored.

In yet another aspect of the invention, a system is provided for restricting the installation of a software product. A set-up program generates an installer identifier representing a characteristic of the software product media containing the software product. The set-up program also compares the generated installer identifier to a stored installer identifier and enables the installation of the software product's run-time files in response to a determination that the generated installer identifier matches the stored installer identifier.

The various aspects of the present invention may be more clearly understood and appreciated from a review of the following detailed description of the disclosed embodiments and by reference to the drawings and claims.

DETAILED DESCRIPTION

In an exemplary embodiment of the present invention, an antipiracy software licensing system is provided that associates a license file to a particular software product, so that the license file cannot be used with a separate product. This embodiment of the present invention associates the license with one and only one product by adding an Installer Identifier (IID) to the license file. The IID is an identification number that is used to identify a software product by characterizing the media on which the software product originally resides. The IID may be generated by "hashing" the files on the media containing a particular software product or by any other means for associating the IID with the particular, licensed software product.

At set-up, a user can insert the software media and run a set-up program. The set-up program will usually require that the user enters a product key associated with the software media (e.g., printed on a label on the media). Once the user has entered the correct product key, the set-up program will transfer the required run-time files and the license file on the media (media license file) from the software media to the user's hard drive. The set-up program will then generate the IID based on a characteristic of the media and will check the generated IID against the IID stored in the license file on the same media. A match will verify that the media license file was not tampered with prior to installation and that the license file is intended to be used with the software product on the media. If there is a match, the media license file and a hardware identifier (HWID), identifying the computer on which the software is being installed, are stored in a hardware signature file. However, if there is not a match, then the installation will be halted and the user will be informed of the inability to install the software.

At run-time the locally stored license file (i.e., local license file) with the HWID of the local machine is computed and compared against the license in the hardware signature file. This is done to verify that local license file was not tampered with after installation has been completed. If there is a match it is assumed that the local license file is properly associated with the installed software product and execution of the software product is enabled. If there is not a match, the user will be prompted to repair the software.

Figure 1:
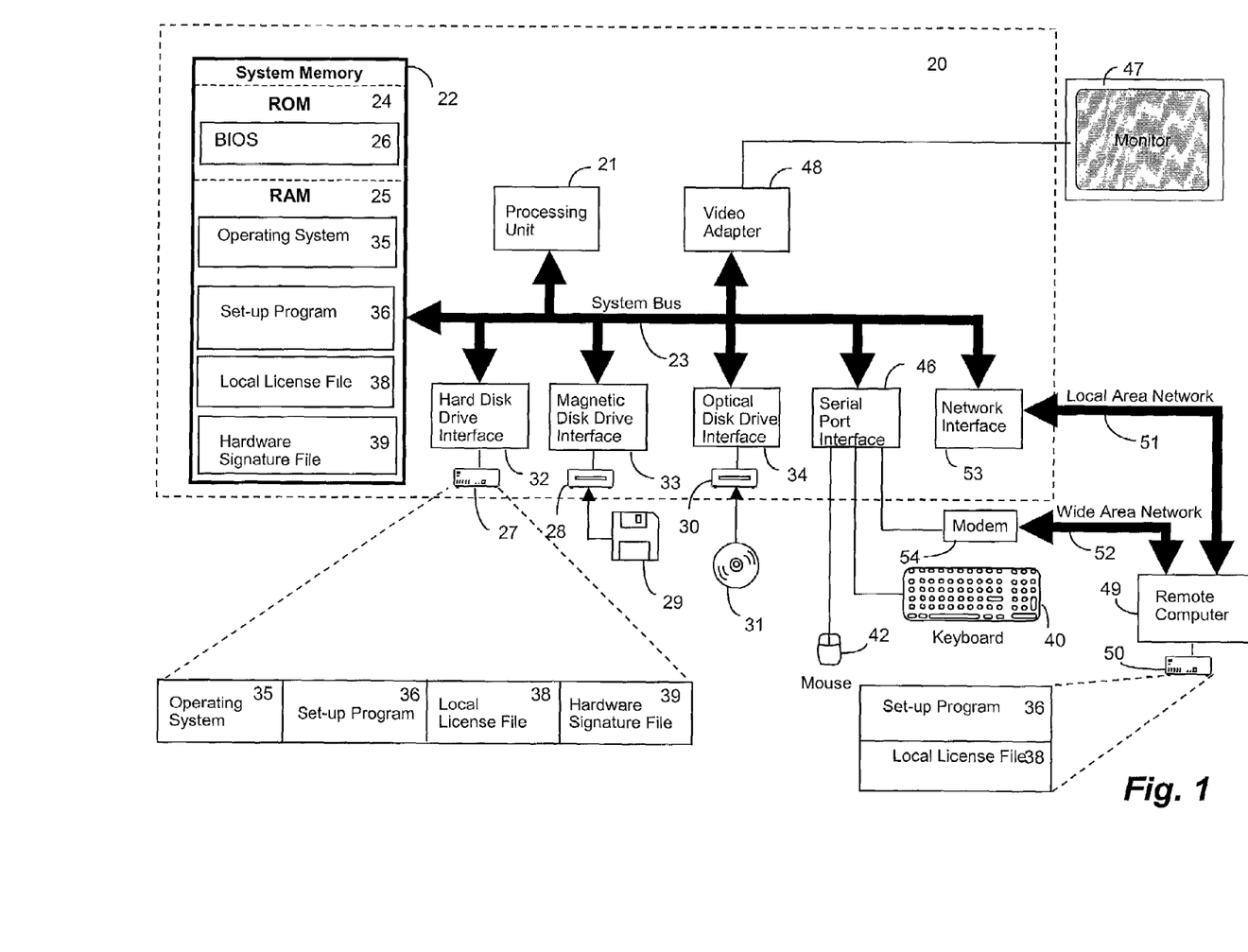
FIG. 1 is a block diagram illustrating an exemplary operating environment for implementing of the present invention.

Exemplary embodiments of the present invention will hereinafter be described with reference to the drawings, in which like numerals represent like elements throughout the several figures. FIG. 1 illustrates an exemplary operating environment for implementation of the present invention. The exemplary operating environment includes a general-purpose computing device in the form of a conventional personal computer 20. Generally, a personal computer 20 includes a processing unit 21, a system memory 22, and a system bus 23 that couples various system components including the system memory 22 to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26, containing the basic routines that help to transfer information between elements within personal computer 20, such as during start-up, is stored in ROM 24.

Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. Although the exemplary environment described herein employs hard disk 27, removable magnetic disk 29, and removable optical disk 31, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 20.

A number of program modules may be stored on hard disk 27, magnetic disk 29, optical disk 31, ROM 24, or RAM 25, including an operating system 35, a set-up program 36, a local license file 38, and a hardware signature file 39. Program modules include routines, sub-routines, programs, objects, components, data structures, etc., which perform particular tasks or implement particular abstract data types. Aspects of the present invention may be implemented in the form of a set-up program 36 that can be incorporated into or otherwise in communication with a local license file 38. The set-up program 36 generally comprises computer-executable instructions for setting-up and installing a software product. The local license file 38 generally comprises computer-executable instructions and/or data enabling the installation and/or execution of a software product associated with the license file. The local license file 38 is generally accessible to the set-up program 36, but can also be implemented as an integral part of the set-up program.

A user may enter commands and information into personal computer 20 through input devices, such as a keyboard 40 and a pointing device 42. Other input devices (not shown) may include a microphone, joystick, game pad, satellite dish, scanner, or the like. These and other input devices are often connected to processing unit 22 through a serial port interface 46 that is coupled to the system bus 23, but may be connected by other interfaces, such as a parallel port, game port, a universal serial bus (USB), or the like. A display device 47 may also be connected to system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers 49. Remote computer 49 may be another personal computer, a server, a client, a router, a network PC, a peer device, or other common network node. While a remote computer 49 typically includes many or all of the elements described above relative to the personal computer 20, only a memory storage device 50 has been illustrated in the figure. The logical connections depicted in the figure include a local area network (LAN) 51 and a wide area network (WAN) 52. Such networking environments are commonplace in offices, enterprise-wide computer networks, intranets, and the Internet.

When used in a LAN networking environment, the personal computer 20 is often connected to the local area network 51 through a network interface or adapter 53. When used in a WAN networking environment, the personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device 50. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
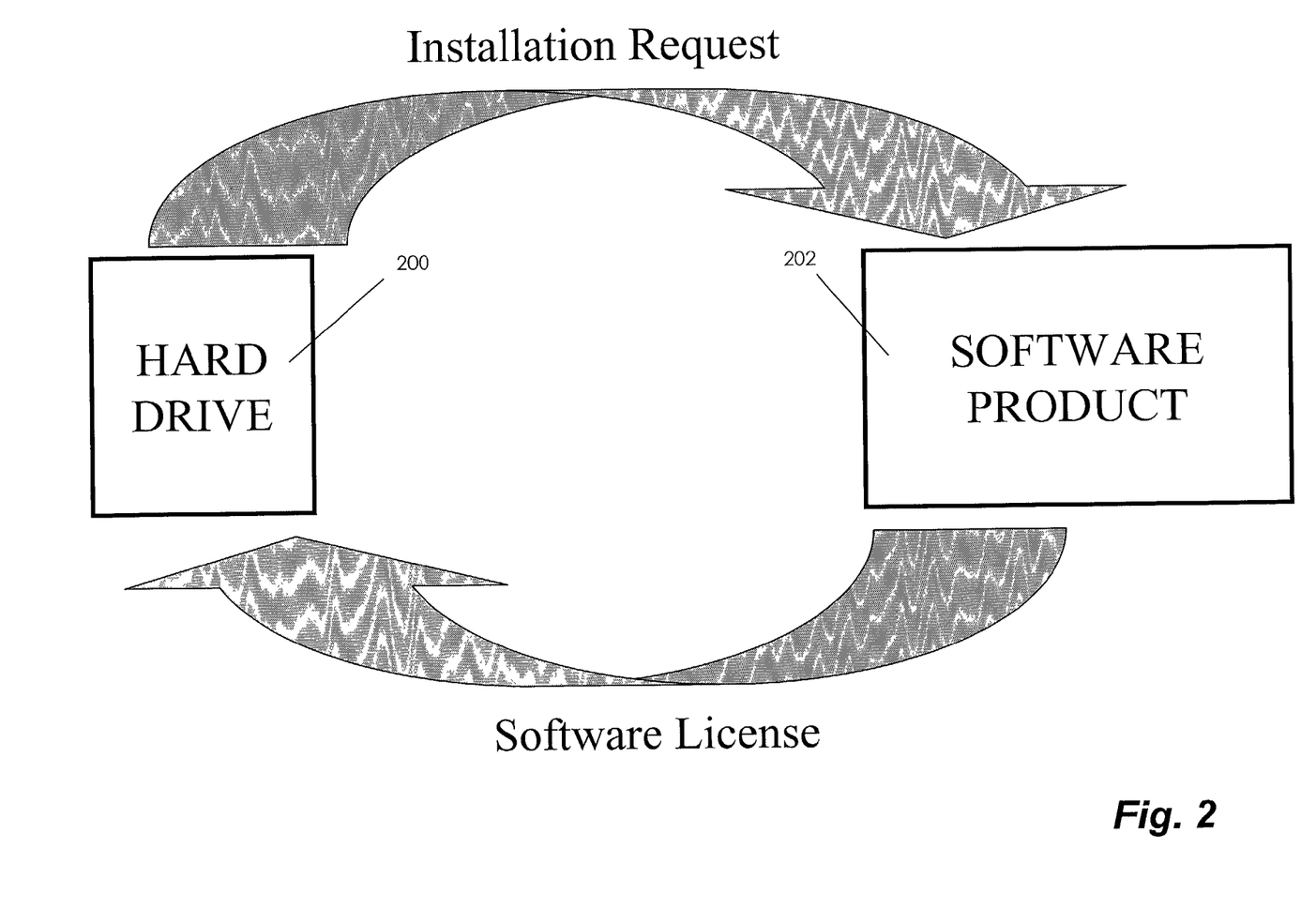
FIG. 2 depicts an exemplary installation transaction between a computer and a software product media.

FIG. 2 depicts an exemplary installation transaction between a computer and a software product media. In FIG. 2, a hard drive 200 transmits an installation request to a software product 202. Typically, an installation request will constitute an instruction to install the software product 202 on the hard drive 200. Often, this is done by executing a set-up program that is located on the software product 202. Those skilled in the art will appreciate that virtually any means of triggering an installation of a software product 202 could be used.

In response to the installation request, the software product 202 can transmit a software license to the hard drive 200. The software license is a security file that can be used to verify that the user is attempting to install an authorized copy of the software product. When execution of the installed software product is subsequently attempted, the presence of the software license on the hard drive can be verified prior to enabling execution. Execution of the installed software product can be disabled in the absence of an acceptable software license file. Execution of the installed software product will be enabled, when the presence of an acceptable software license is determined.

As an additional anti-piracy step, the installation transaction may require the entry of a software product key. The software product key is a password associated with the software product. Installation and/or subsequent execution of the software product may be disabled, in response to the entry of an incorrect software product key. A software product key is often physically associated with the software product, such as by a label affixed to the software product media containing the software product.

The installation transaction depicted in FIG. 2 can reduce the use of illicit copies of software products by disabling those products. However, a software anti-piracy system utilizing this transaction is susceptible to circumvention. For example, if the software license is provided as a license file, the file can be duplicated and used to enable the execution and/or installation of illicitly duplicated software products. When an illicitly installed software product on a hard drive 200 checks for a license file, execution may be inadvertently enabled by the recognized presence of an illicitly duplicated license file. Moreover, the license file for one software product may be duplicated and used to enable the execution of an illicitly installed copy of a second software product.

Therefore, an anti-piracy system utilizing the installation transaction depicted in FIG. 2 can be improved by limiting the use of a license file to enabling the execution of only one software product. Embodiments of the present invention so limit the use of a license file, by associating the license file with at least one characteristic of the software product.

Figure 3:
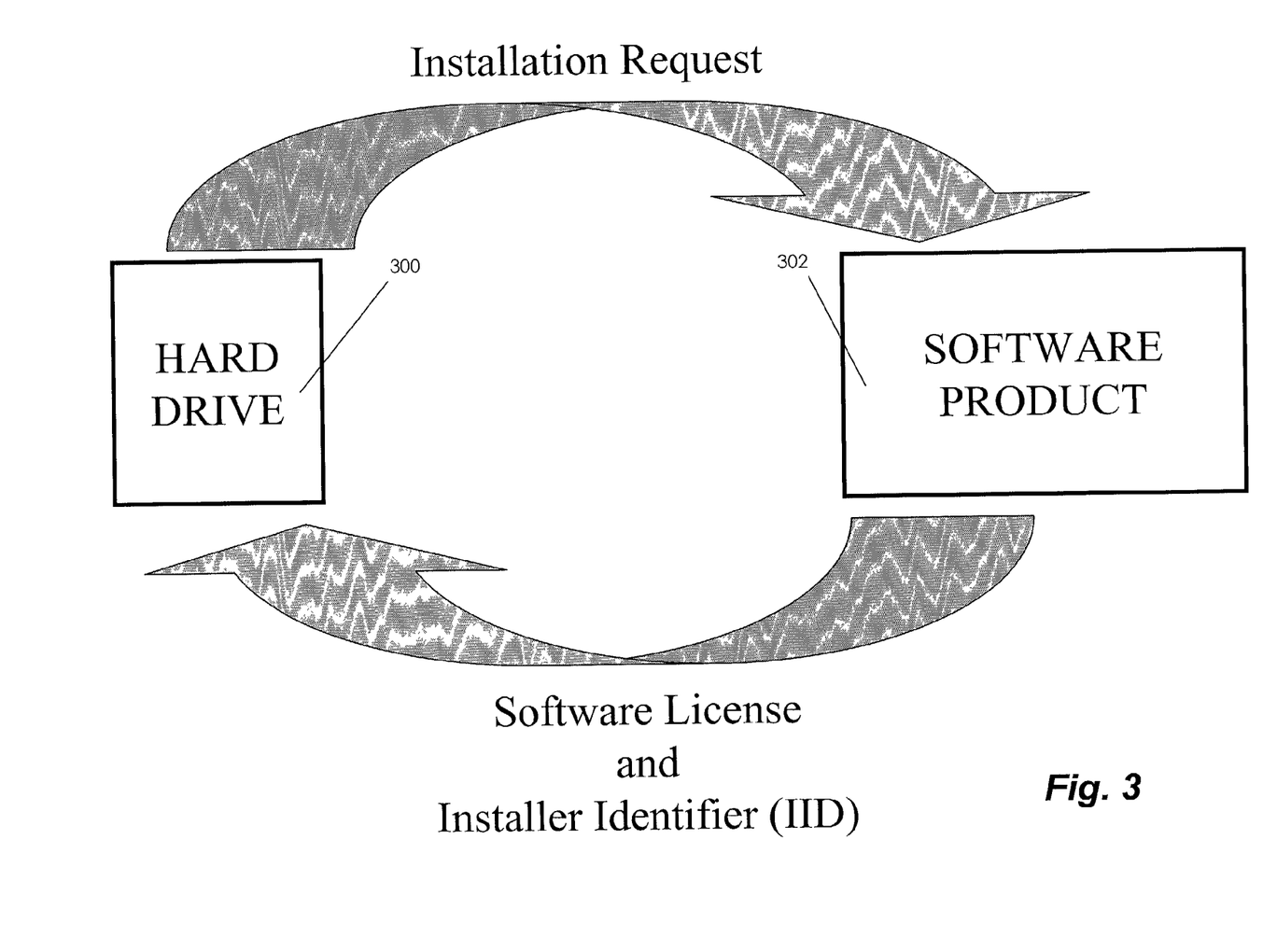
FIG. 3 depicts an installation transaction performed by an exemplary embodiment of the present invention.

FIG. 3 depicts an installation transaction performed by an exemplary embodiment of the present invention. As with the installation transaction described in connection with FIG. 2, the installation transaction depicted in FIG. 3 includes the transfer of a software license from a software product 302 to a hard drive 300 in response to an installation request. However, the installation transaction of FIG. 3 also involves the transfer of an installer identifier (IID). The IID provides a connection between the transferred license file and the software product 302. In an exemplary embodiment of the present invention, the IID is an identifying characteristic of the software product 302. For example, the IID may be a "hash" value representing all of the files on the media containing the software product 302 (e.g., a compact disc). A hash value is a well-known means for adding or summarizing data to generate a number characterizing the data. A hash value can be used, for example, for error checking the underlying data. It will be appreciated by those skilled in the art that various other identifying characteristics of the software product 302 could be used in accordance with embodiments of the present invention.

Figure 4:
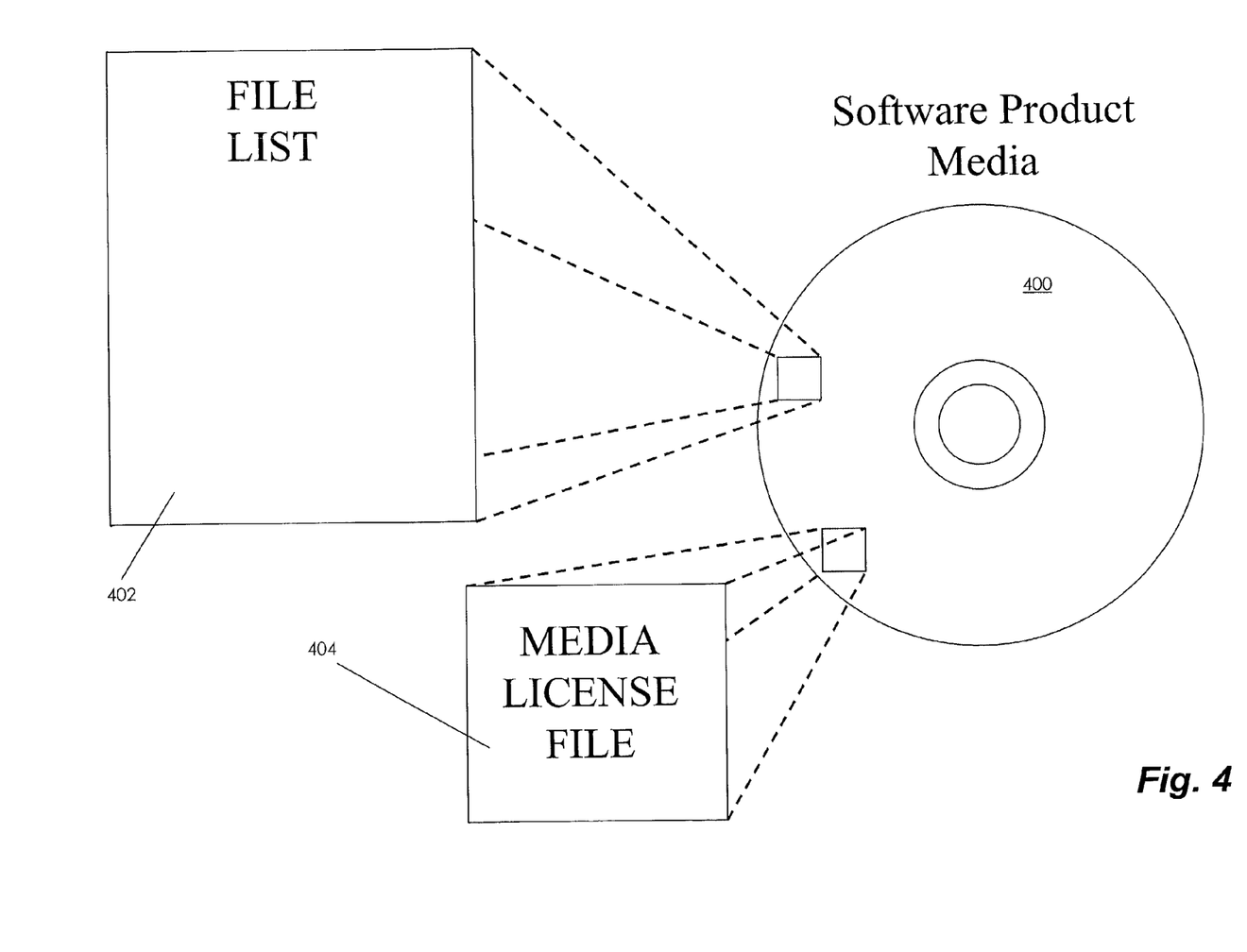
FIG. 4 depicts an exemplary software product media containing a software product that can be protected by an exemplary embodiment of the present invention.

FIG. 4 depicts an exemplary software product media 400 containing a software product that can be protected by an exemplary embodiment of the present invention. The software product media 400 contains all of the necessary files to execute a software product. The software product media 400 also contains a license file 404. As described above, the license file 404 can be transferred to a computer to limit the execution of the software product. The software product media 400 can also include a file list 402 containing a list or a summary of all of the files contained by the software product media 400. Alternatively, the file list 402 could be generated by scanning the software product media 400 and compiling a list of the files found thereon.

In an embodiment of the present invention in which the IID is a hash value, the contents of the file list 402 could be processed by a hashing algorithm to generate a hash value. The hash value could be transferred as an IID along with the license file 404, in order to limit the execution of the associated software product to a computer having a copy of the license file as well as an accurate record of an IID that matches the hash value of the software product media 400.

By using both the license file 404 and the IID, an embodiment of the present invention can be used to disable the execution of a software product where the license file and/or the IID do not conform to the applicable characteristics of software product media 400. Accordingly, illicit copies of the software product media can be disabled. Execution of a software product can be disabled when it is recognized that a license file associated with one software product is being used to attempt the execution of a separate software product.

Figure 5:
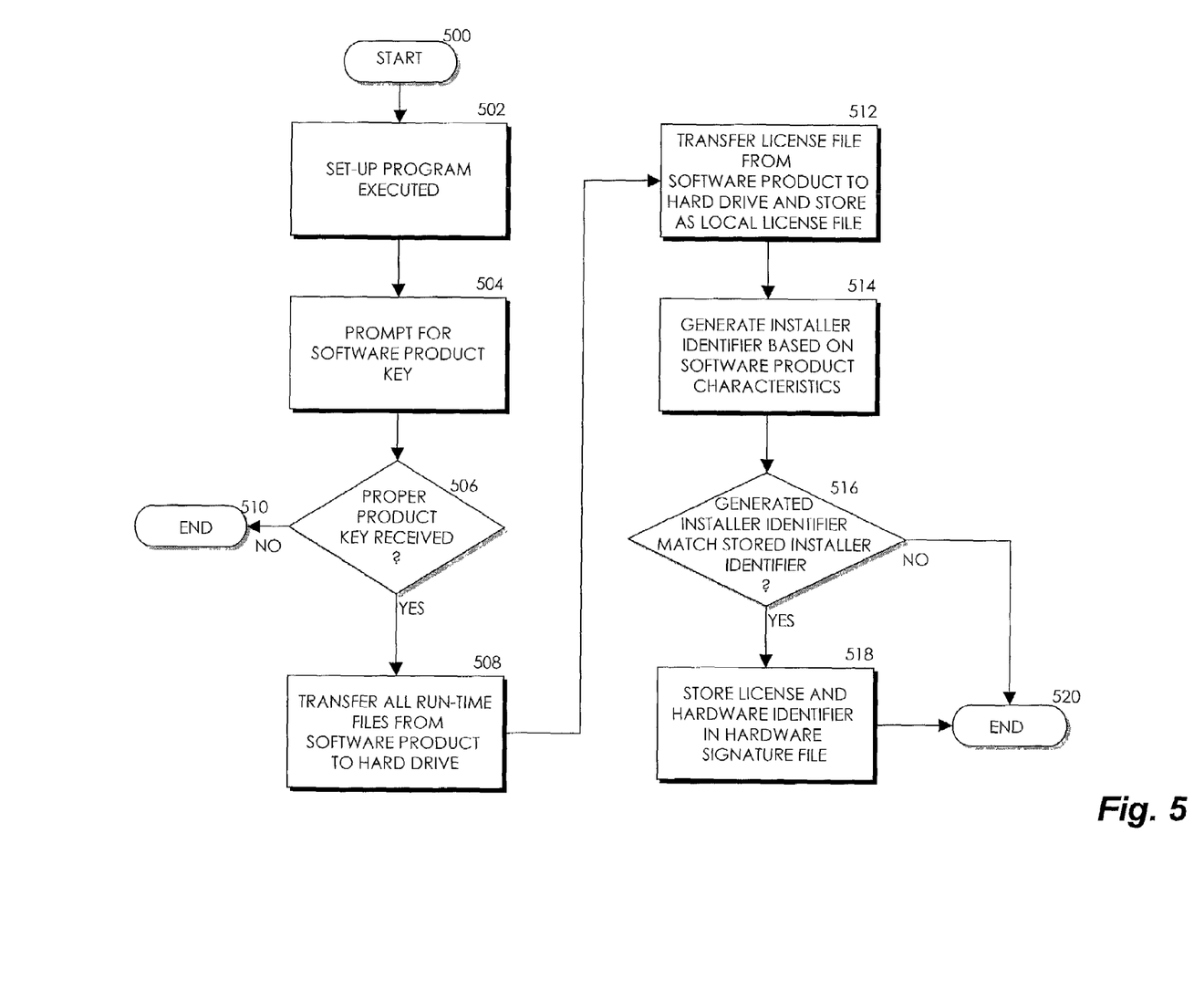
FIG. 5 is a flow chart depicting an exemplary method for installing a software product that is protected by a software license and an installer identifier.

FIG. 5 is a flow chart depicting an exemplary method for installing a software product that is protected by a software license and an installer identifier. The method of FIG. 5 starts at block 500 and proceeds to step 502. At step 502, a set-up program is executed. Typically, the first step of the installation of a software product is the execution of a set-up program. Set-up programs are commonly stored on a software product media and are usually executed directly from the software product media. The method of FIG. 5 proceeds from step 502 to step 504. At step 504, a prompt for a software product key is generated. As described above in connection with FIG. 2, the software product key is typically physically associated with a software product media. For example, the software product key may be printed on a label that is affixed to a case holding the software product media.

The method proceeds from step 504 to decision block 506. At decision block 506, a determination is made as to whether the proper product key was received. If the proper product key was not received, the method proceeds to step 510 and ends. Alternatively, the method could at this point prompt the re-entry of the product key or could generate a dialog box with an explanation that the installation had been stopped in response to an incorrect product key. In any case, the method can terminate installation at step 510 when an incorrect product key has been entered. On the other hand, if a determination is made at decision block 506 that the proper product key has been received, then the method proceeds to step 508.

At step 508, all run-time files can be transferred from the software product media to a hard drive. For the purposes of the description of this exemplary embodiment, run-time files are simply those files needed to execute the software product on the computer associated with the hard drive. The method proceeds from step 508 to step 512. At step 512, the license file is transferred from the software product media to the hard drive and is stored as the local license file.

The method proceeds from step 512 to step 514. At step 514, an installer identifier (IID) is generated. The IID in this embodiment is generated based on one or more characteristics of the software product. For example, as described in connection with FIG. 4, the IID can be a hash value corresponding to a file list that is associated with the soft product media. The method proceeds from step 514 to decision block 516. At decision block 516, a determination is made as to whether the generated IID matches a stored IID. The stored IID can be stored within the license file that is stored on the software product media. Thus, it can be assumed that if the generated IID matches the stored IID, then the stored license file corresponds to the software product contained on the software product media from which the generated IID was produced. That is, the match verifies that the proper license file is being used to install the software product from the software product media.

If a determination is made at decision block 516 that the generated IID does not match the stored IID, the method branches to step 520 and ends. Alternatively, the method could generate a dialog box to display an explanation for the terminated installation transaction. If, on the other hand, a determination is made at decision block 516 that the generated IID matches the stored IID, the method branches to step 518. At step 518, the license and a hardware identifier are stored in a hardware signature file. The hardware identifier can be used to identify the computer that is the host of the hard drive on which the software product has been installed. Once the license and hardware identifier have been stored, the method proceeds to step 520 and ends. Thus, the method of FIG. 5 either successfully enables or disables the installation of the software product. As is described in more detail in connection with FIG. 6, the license stored in the hardware signature file can be used to enable and disable the execution of the installed software product.

Figure 6:
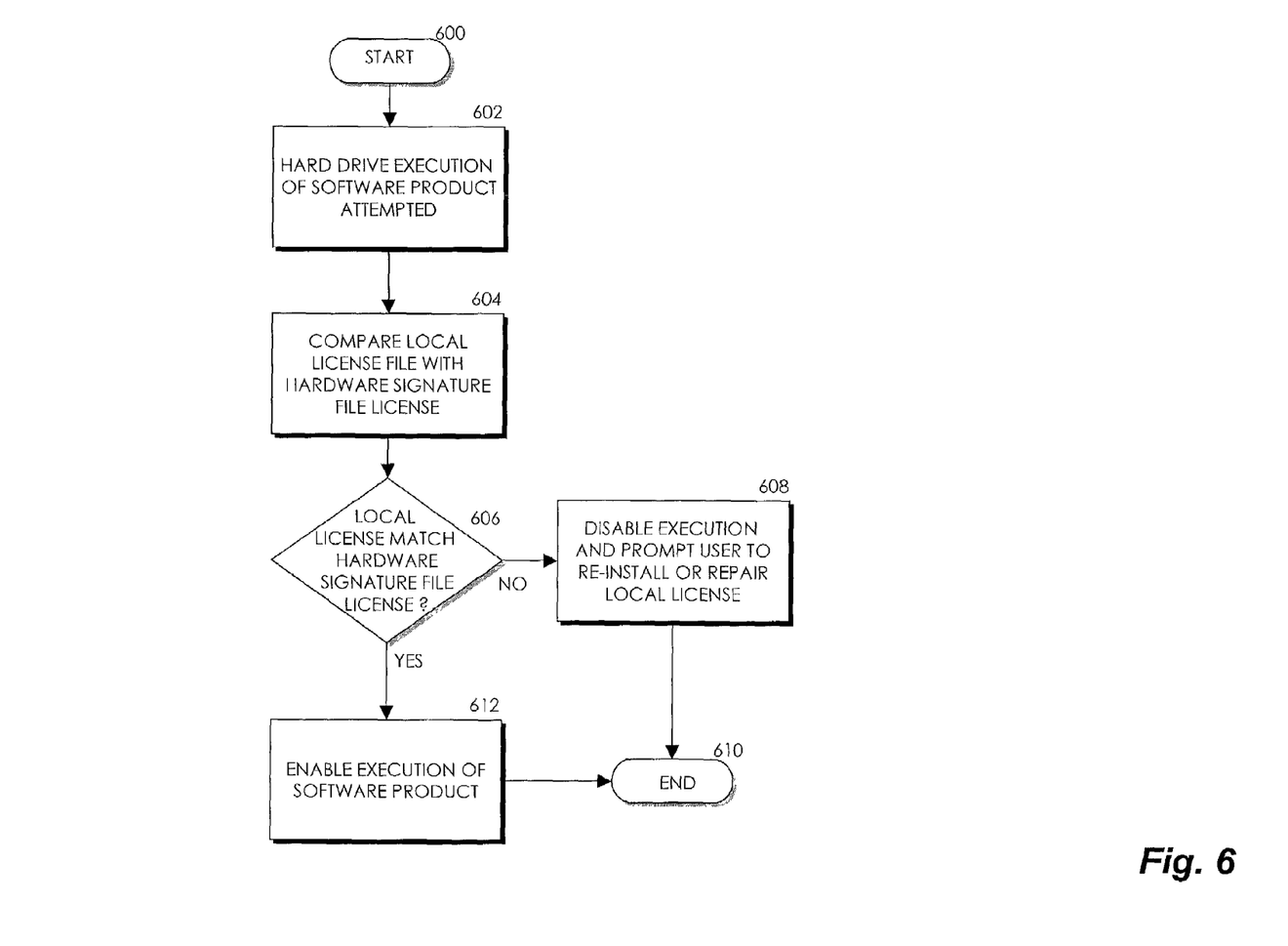
FIG. 6 is a flow chart depicting an exemplary method for enabling and disabling the execution of a software product that is protected by a software license and an installer identifier.

FIG. 6 is a flow chart depicting an exemplary method for enabling and disabling the execution of a software product that is protected by a software license and an installer identifier. The method of FIG. 6 starts at block 600 and proceeds to step 602. At step 602, an attempt is made to execute the software product that has been previously installed on a hard drive. The method proceeds to step 604, wherein the local license file stored on the hard drive is compared with the license stored in the hardware signature file. The method then proceeds to decision block 606.

At decision block 606, a determination is made as to whether the local license matches the license stored in the hardware signature file. If the local license does not match the license stored in the hardware signature file, the method branches to step 608. At step 608, a prompt is generated to re-install the run-time files on the hard drive or to repair the local license file. The method then proceeds to step 610 and ends, thereby disabling execution of the software product. Returning to decision block 606, if a determination is made that the local license file matches the license in the hardware signature file, the method branches to step 612. At step 612, execution of the software product is enabled. The method then proceeds to step 610 and ends.

By requiring the matching of a generated IID and a stored IID as a prerequisite to storing a license in a hardware signature file, an exemplary embodiment of the present invention verifies that the use of the license is restricted to enabling the installation and execution of a particular software product. Additionally, by comparing a local license file with the license stored in the hardware signature file, an exemplary embodiment of the present invention prohibits the execution of illicitly installed software products.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for permitting the controlled installation of a software product, including an associated run-time file needed to execute the software product, onto a local machine, the method comprising:
- generating an installer identifier at the local machine based on the software product, in response to a request to install the software product on the local machine, wherein the generated installer identifier represents a characteristic of a software product medium on which the software product is stored;
- comparing the generated installer identifier to a stored installer identifier on the software product;
- storing a license file and a hardware identifier identifying the local machine on the local machine in response to a match between the generated installer identifier and the stored installer identifier;
- enabling a complete installation of the software product on the local machine, including installing at least one run-time file needed to execute the software product, in response to the match between the generated installer identifier and the stored installer identifier;
- whereby the stored license file is associated only with the software product installed on the local machine and the hardware identifier is associated only with the local machine, and the stored license file can be subsequently accessed to enable the execution of the completely installed software product including the installed at least one run-time file on the local machine but cannot be used with a separate software product or to execute the software product on a machine other than the local machine;
- receiving a software product key; and
- wherein installing on the local machine the at least one run-time file needed to execute the software product occurs in response to a determination that the received software product key is a correct software product key.

2. A computer readable medium having stored thereon computer-executable instructions for performing the method of claim 1.

3. The method of claim 1, wherein the generated installer identifier represents a characteristic of a file list corresponding to the software product media.

4. The method of claim 3, wherein the generated installer identifier is a hash value representing the characteristic of the file list corresponding to the software product media.

5. The method of claim 1, further comprising the step of executing a set-up program.

6. The method of claim 1, wherein the license file is stored in a hardware signature file on the local machine.

7. A method for permitting the controlled installation and execution on a local machine of a software product including an associated run-time file needed to execute the software product, the method comprising:
- generating an installer identifier on the local machine in response to a request to install the software product on the local machine, wherein the generated installer identifier represents a characteristic of a software product medium on which the software product is stored;
- comparing the generated installer identifier to a stored installer identifier on the software product;
- storing a license file and a hardware identifier identifying the local machine on the local machine in response to a match between the generated installer identifier and the stored installer identifier;
- enabling a complete installation of the software product on the local machine, including installing at least one run-time file needed to execute the software product in response to a match between the generated installer identifier and stored installer identifier whereby the stored license file is associated only with the software product installed on the local machine and the hardware identifier is associated only with the local machine:
- enabling the execution of the software product on the local machine, in response to a determination that a proper license file and hardware identifier have been stored on the local machine:
- receiving a software product key: and
- wherein installing on the local machine the at least one run-time file needed to execute the software product occurs in response to a determination that the received software product key is a correct software product key.

8. A computer readable medium having stored thereon computer-executable instructions for performing the method of claim 7.

9. The method of claim 7, wherein the generated installer identifier represents a characteristic of a file list corresponding to the software product media.

10. The method of claim 9, wherein the generated installer identifier is a hash value representing the characteristic of the file list corresponding to the software product media.

11. The method of claim 7, wherein the determination that the proper license file has been stored comprises determining that the stored license file matches a second license in a hardware signature file on the local machine.

* * * * *